(12) United States Patent  (10) Patent No.: US 8,205,927 B2
Eggers  (45) Date of Patent: Jun. 26, 2012

(54) AUTOMATED FLEXIBLE TARPING SYSTEM

(75) Inventor: Ronald L. Eggers, Fremont, NE (US)

(73) Assignee: Aero Industries, Inc., Indianapolis, IN (US)

( * ) Notice: Subject to any disclaimer, the term of this patent is extended or adjusted under 35 U.S.C. 154(b) by 0 days.

(21) Appl. No.: 12/946,239

(22) Filed: Nov. 15, 2010

(65) Prior Publication Data

US 2011/0115247 A1    May 19, 2011

Related U.S. Application Data

(60) Provisional application No. 61/261,399, filed on Nov. 16, 2009.

(51) Int. Cl.
*B60J 7/04* (2006.01)
(52) U.S. Cl. ........................................................ 296/98
(58) Field of Classification Search .................. 296/98, 296/100.14, 100.15
See application file for complete search history.

(56) References Cited

U.S. PATENT DOCUMENTS

| 4,023,857 | A  | * | 5/1977 | Killion | 296/98 |
| 6,578,897 | B2 |   | 6/2003 | White |  |
| 6,712,419 | B1 |   | 3/2004 | Gothier |  |
| 2002/0140249 | A1 | * | 10/2002 | Henning | 296/98 |

* cited by examiner

*Primary Examiner* — Dennis Pedder
(74) *Attorney, Agent, or Firm* — Maginot, Moore & Beck, LLP

(57) ABSTRACT

An automated tarping system for open-topped containers includes a winding mechanism and an extension mechanism. The winding mechanism is attached to the container and to a cover and exerts a winding force to retain the cover so that the top of the container remains open. The extension mechanism utilizes a drive mechanism which exerts an extension force on a cable to pivot an arm to which a cover is attached. The arm is pivotally attached to a side of the container and is connected to the cable. When the drive mechanism exerts the extension force on the cable, the arm, which is connected, pivots with respect to the container. The cover, which is connected to the arm, is then drawn across the open-top of the container to close the top of the container as the extension force exerted by the drive mechanism overcomes the winding force generated by the winding mechanism.

20 Claims, 5 Drawing Sheets

AUTOMATED FLEXIBLE TARPING SYSTEM

CROSS-REFERENCE TO RELATED APPLICATION

This application claims priority to provisional application Ser. No. 61/261,399, filed on Nov. 16, 2009, the entire disclosure of which is incorporated herein by reference.

BACKGROUND

The present disclosure relates to covers, referred to as tarping systems, for open-topped containers. The invention is particularly related to a tarping system for use with hauling vehicles, such as dump trucks, in which the flexible cover or tarpaulin extends across the open top of the truck container.

Some hauling vehicles, such as dump trucks, include open-topped containers used for hauling or storing various materials. For example, in a typical dump truck application, the container may be used to haul earth, gravel, aggregate, or other products. In addition, the container may be used to haul organic materials, such as grain or produce.

Depending upon the nature of the hauled materials, users may desire to provide a cover for the container. Rigid covers, which may be hinged from one end of the container body, are well known; however, rigid covers have gradually given way in the industry to flexible tarping systems. Flexible tarping systems can be easily stowed when a cover is not necessary, such as when the container is being loaded and unloaded. Moreover, flexible tarping systems are much easier to deploy than rigid covers.

A variety of flexible tarping systems have been developed that utilize tarpaulins ("tarps"). One such tarping system includes a tarp that is wound around a spool at one end of the container. A rope attached to the free end of the tarp can be used to unwind or deploy the tarp manually over the length of the container. Manual deployment types of flexible tarping systems are more easily deployed than rigid covers; however, some flexible tarping systems can be even more conveniently deployed.

As illustrated in FIG. 1, some known flexible tarping systems include a spring biased U-shaped bail arm 10 that automatically covers the open top of the container. The U-shaped bail arm 10 is pivotally mounted at its ends to the base of a container 14. The horizontal crossbar of the U-shaped bail arm 10 is attached to the first end of a tarp 18. The second end of the tarp 18 is wound upon a tarp roller 22 at the front of the container 14. An extension mechanism 26, such as a pair of springs, biases the bail arm 10 toward the rear of the container 14. A release member (not illustrated) maintains the position of the bail arm 10 toward the front of the container 14, against the force of the extension mechanism 26. To cover the container 14 the release member is disengaged causing the extension mechanism 26 to pivot the bail arm 10 toward the rear of the container 14. The rearward movement of the bail arm 10 unfurls the tarp 18 from tarp roller 22 and covers the container 14. A hand crank or motor 30 can be coupled to the tarp roller 22 to rewind the tarp 18 and pivot the bail arm 10 toward the front of the container 14 in order to uncover the container 14. As illustrated, the motor 30 is usually mounted on the top front portion of the container 14, close to the tarp roller 22.

While the above described tarping system covers and uncovers an open-topped container 14 sufficiently well, there is always room for improvement. For example, in some flexible tarping systems the springs forming the extension mechanism 26 may not always hold the horizontal crossbar of the bail arm 10 against the rear portion of the container 14, resulting in a tarping system that may improperly seal the container 14 or that bounces as the container 14 is moved. In particular, the problem becomes compounded when the container 14 is attached to a truck that is traveling at highway speed, because there is a tendency for wind to cause billowing and flapping of the tarp 18. An extension mechanism 26 having springs that are sufficiently strong could be utilized to hold the tarp 18 firmly against the container 14; however, when strong springs are utilized it becomes prohibitively difficult to wind the crank when retracting the tarp 18. Automating the retraction process with a motor 30 reduces the physical effort required to retract the tarp 18, but the position of the automation system, specifically the motor 30, often leads to additional shortcomings, as explained below.

Automated flexible tarping systems often include a motor 30 positioned near the tarp roller 22 at the front of the container 14. Positioning the motor 30 near the front of the container 14 places the motor 30 in position susceptible to damage, because the upper front portion of many containers 14 is an area prone to damage. For example, when a container 14 is the pivotal open-topped container 14 of a dump truck, the front wall of the container 14 might be forced into contact with tree limbs or other structures, which could damage the motor 30. Furthermore, the top portion of the container 14, including the motor 30, may become inadvertently damaged due to contact from backhoe buckets and other types of construction vehicles, as evidenced by the replaceable wooden sideboards on many dump truck containers 14. Accordingly, positioning the motor 30 of an automated flexible tarping system on the upper front portion of a dump truck container 14 increases the likelihood that the retraction mechanism may become damaged as the truck is operated.

SUMMARY

In order to address the unresolved needs described above, the present invention contemplates a cable driven spring tensioned flexible tarping system. A pivotal U-shaped bail arm is connected to the sidewalls or the bottom of a container. Mounted beneath the container is a motor coupled to a shaft, which spans the width of the container. Cable spools terminate the ends of the shaft, and flexible cables connect the spools to the vertical portions of the U-shaped bail.

The container can be covered by activating the motor, which winds the cables upon the spools. The decreasing length of the cables pulls upon the vertical portions of the bail arm causing the bail arm to pivot from the front to the rear of the container, deploying the tarp and developing a spring tension retraction force in the process. When the bail arm pivots to the rear wall of the container, the motor continues to wind the cables even after the horizontal crossbar has contacted the container, to apply a strong downward directed force to the bail arm. The strong force ensures that the crossbar does not become separated from the container as the container is transported over uneven road surfaces or when the container is attached to a vehicle moving at roadway or highway speeds.

To uncover the container, the motor rotates in a direction that unwinds the flexible cables from the spools thereby permitting the previously generated retraction force to pivot the bail arm toward the front of the container. As the bail arm pivots toward the front of the container, a winding mechanism rewinds the tarp upon a drum. The motor continues to unwind the cables from the spools until the retraction force has drawn the bail arm against the front of the container and the tarp is completely wound upon the drum.

When compared to manually operated tarping systems, the automated flexible tarping system increases the efficiency with which a container is loaded and unloaded. Other benefits and objects of the present invention can be readily discerned upon consideration of the following written description and accompanying figures.

DETAILED DESCRIPTION

Figure 1:
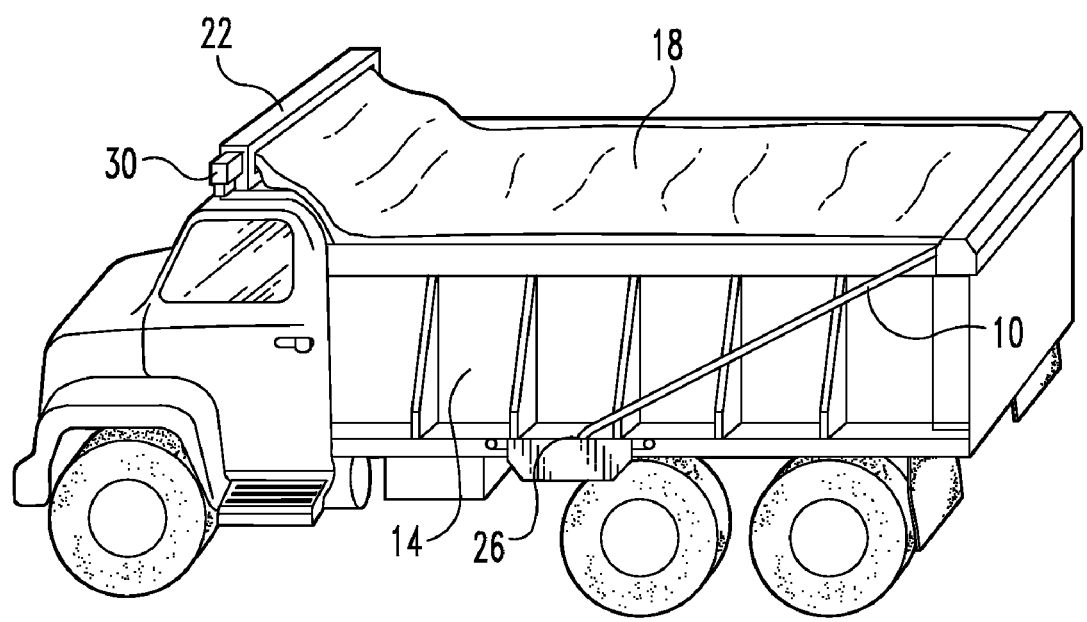
FIG. 1 is a side perspective view of an exemplary vehicle, here illustrated as a dump truck, having a flexible tarping system as known in the art.

For the purpose of promoting an understanding of the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

Figure 2:
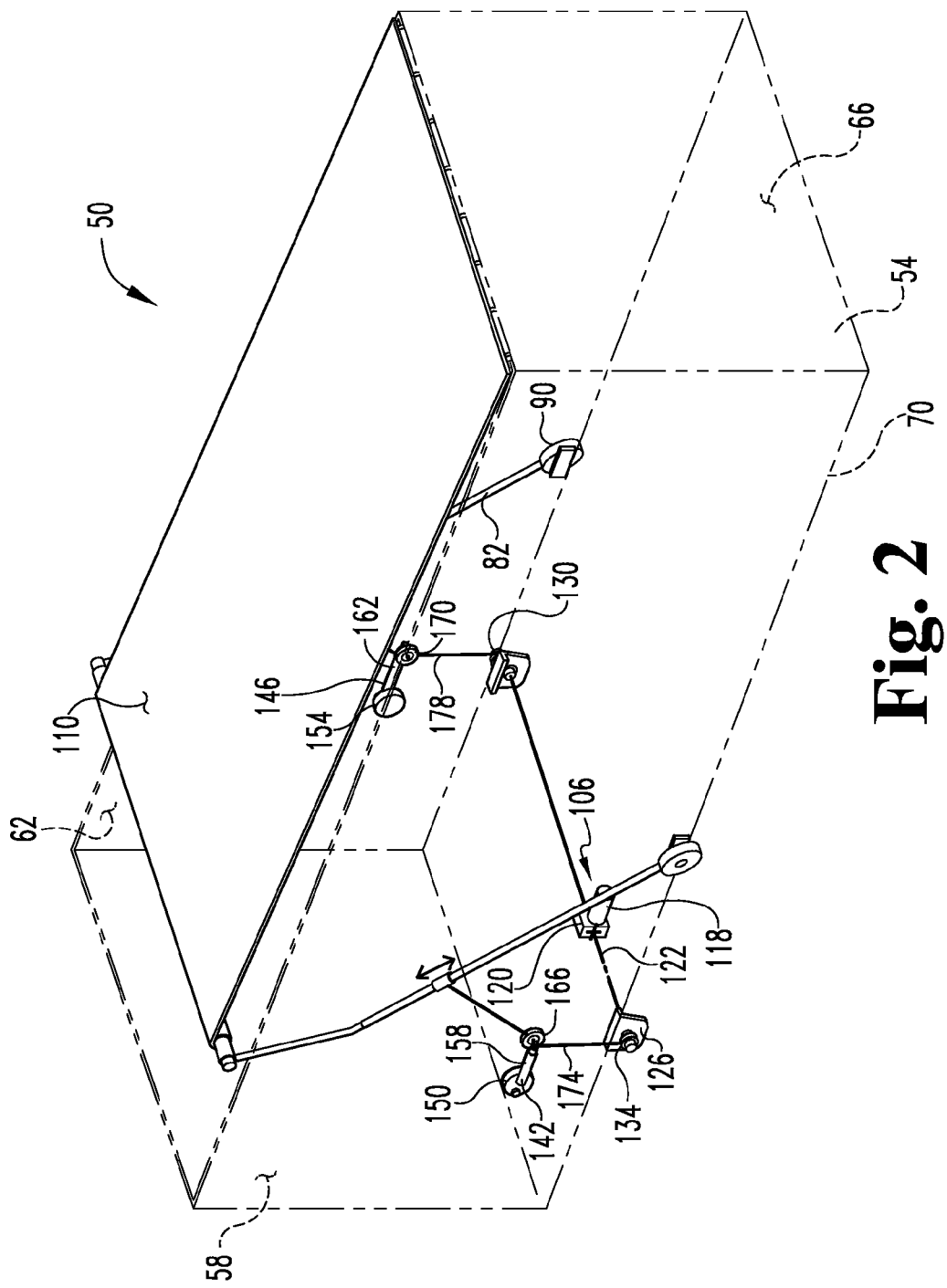
FIG. 2 is a perspective view of a container utilizing an embodiment of the tarping system of the present invention, with the tarping system in the extended configuration.
Figure 3:
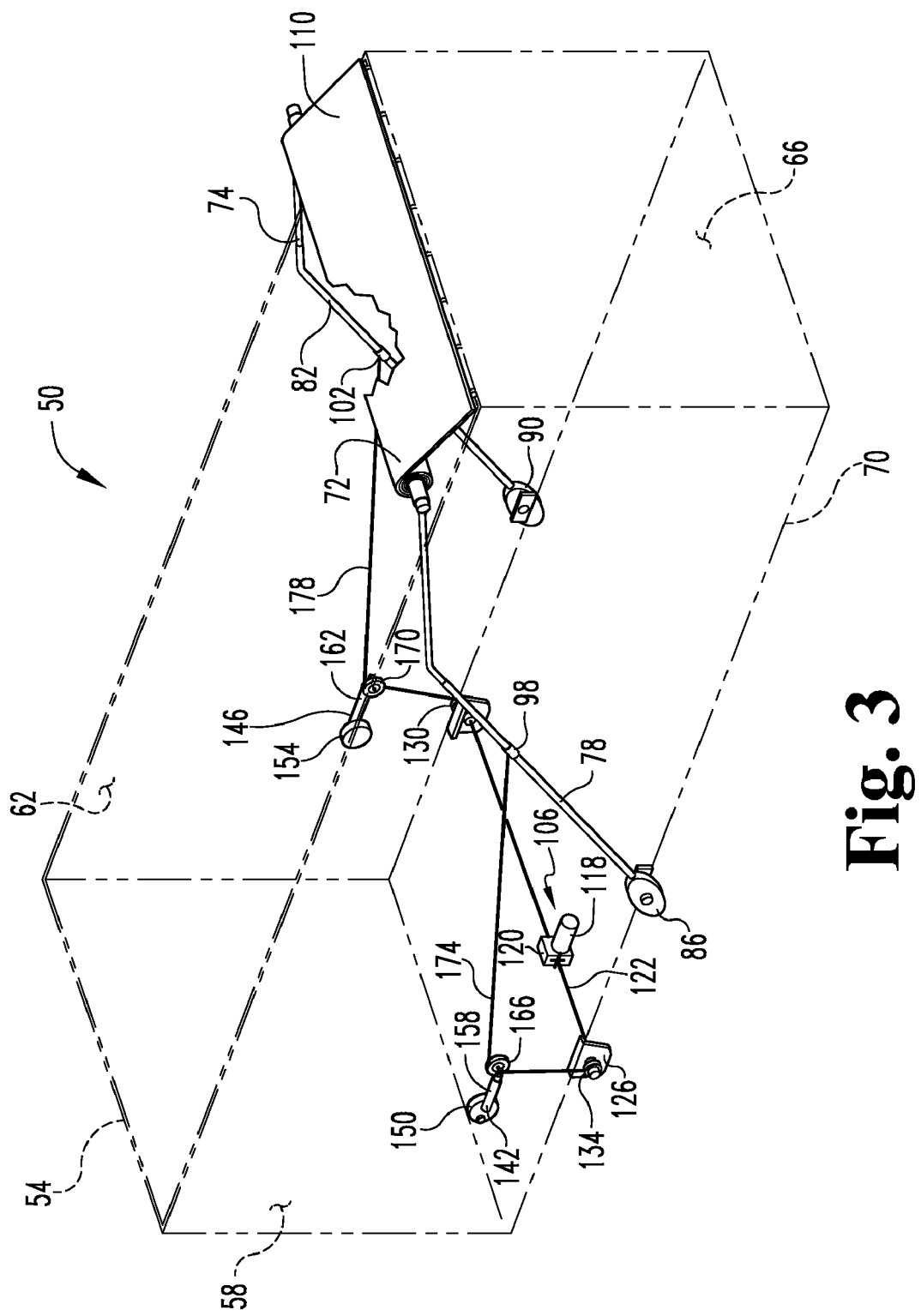
FIG. 3 is a perspective view of a container utilizing the embodiment of the tarping system illustrated in FIG. 2, with the tarping system in the retracted configuration.
Figure 4:
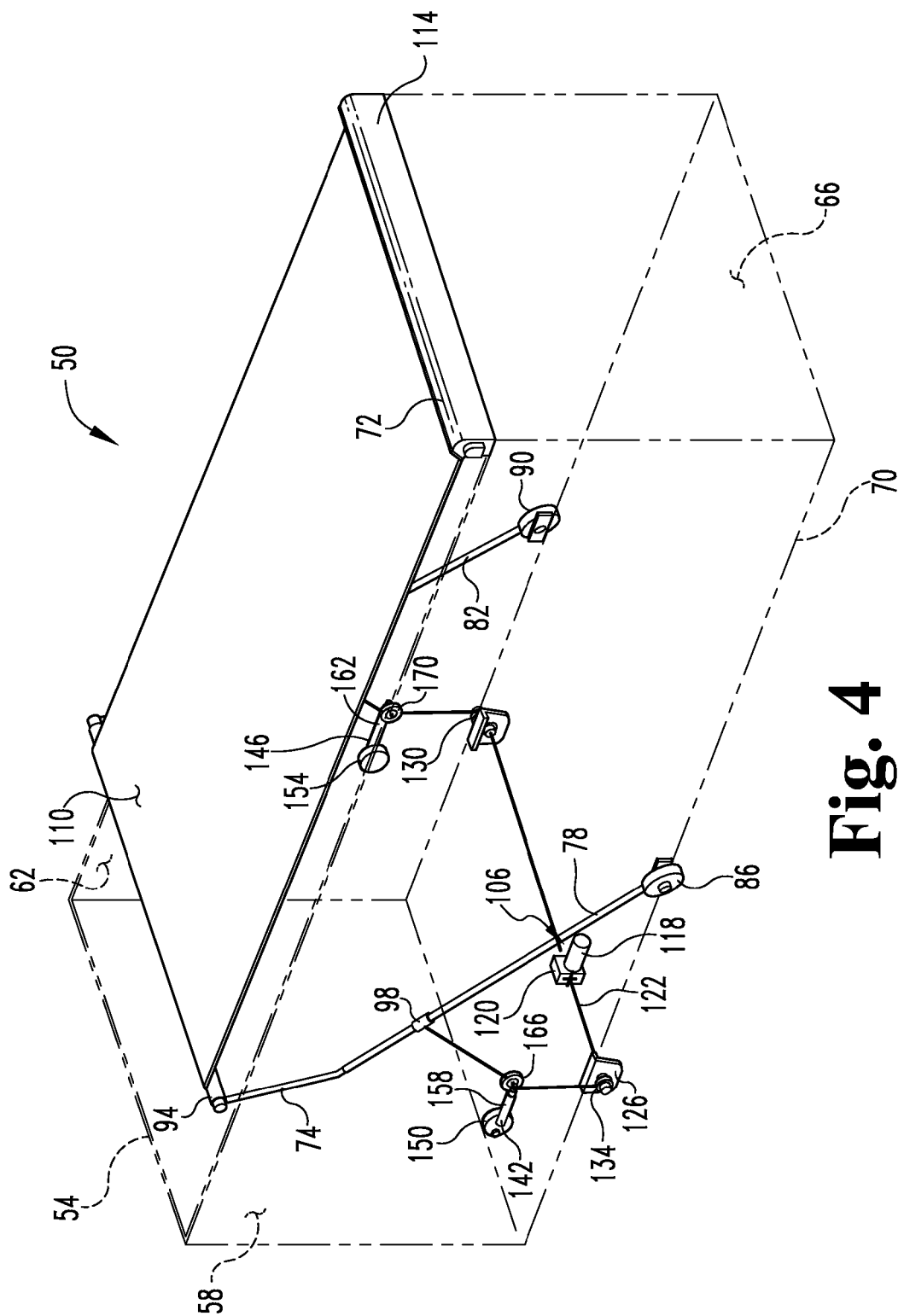
FIG. 4 is a perspective view of a container utilizing a further embodiment of the tarping system of the present invention, with the tarping system in the extended configuration.

Referring now to FIGS. 2, 3, and 4, the tarping system, generally designated 50, is shown installed upon an open-topped container, receptacle, or the like 54. The container 54 is representative of any type of open-topped container 54 that may be attached to or towed by a truck or other vehicle. For illustrative purposes, the container 54 is a pivotal open-topped container of a dump truck, shown removed from the dump truck body. The container 54 includes an open top, a first sidewall 58, a second sidewall 62, a rear wall, a front wall 66, and a bottom wall 70 that together define an interior volume utilized to hold a load. Optionally, the container 54 may include rails, which are supported on the top of the sidewalls 58, 62 as is known in the art.

The tarping system 50 is configured to extend and retract a flexible cover, or tarpaulin ("tarp") 110, across the open top of the container 54. The tarp 110 can be of any known construction including, but not limited to, canvas, polyester coated with latex, or woven polyethylene. The tarp 110 is connected at one end to a winding mechanism 72 carried by a bail arm 74 and at an opposite end to one end of the container 54, as shown in FIG. 2. Alternatively, the tarp 110 is connected at one end to a winding mechanism 72 supported on the container and at an opposite end to a bail arm 74, as depicted in FIG. 4.

As illustrated in FIGS. 2 and 3, the winding mechanism 72 may be located within the horizontal portion 94 of the bail arm 74. Alternatively, the winding mechanism 72 and drum may be mounted to the front wall 66 of the container 54, preferably under a shroud 114, as illustrated in FIG. 4. In one embodiment the winding mechanism 72 generates a retraction force that winds the tarp 110 upon a drum. Thus, the winding mechanism 72 may include a drive motor or a torsion spring operable to rotate the drum as the tarping system 50 retracts the tarp 110.

The tarping system 50 includes a U-shaped bail arm 74, which pivots between an extended and a retracted position. The U-shaped bail arm 74 includes side arms 78, 82, and a horizontal portion 94 that spans the width of the container 54 and is connected to the tarp 110. The base of each arm 78, 82 includes a pivot mount 86, 90 for pivotably mounting the bail arm to the vehicle or container. In certain embodiments, the pivot mount may be a corresponding retraction mechanism which pivotally secures the side arms 78, 82 to either the sidewalls 58, 62 or to the bottom wall 70 of the container 54. The retraction mechanisms at the pivot mounts 86, 90 may include one or more coil or torsion springs operable to pivot the bail arm 74 toward one end or the other of the container 54 to retract or extend the tarp 110. The retraction mechanisms may be used in lieu of or in addition to a winding mechanism 72 powered as described above. In the embodiments disclosed herein, a single bail arm 74 is provided to extend and retract the cover or tarp. Alternatively, multiple U-shaped bail arms may be provided to support the tarp 110 at intermediate positions along the length of the tarp, with the multiple bail arms configured to work in cooperation to extend and retract the tarp.

The side arms 78, 82 include brackets 98, 102, which connect the U-shaped bail arm 74 to a tarp extension mechanism 106. The extension mechanism 106 includes a drive mechanism which may be in the form of an engine, a motor, a spring, a hand crank or any other device that generates motion. In the one embodiment, the drive mechanism includes a motor 118 and an optional gearbox 120 to gear down the rotational speed of the motor. Both the motor 118 and the gearbox 120 may be supported on a wall of the container 54 such as the bottom wall 70. The extension mechanism 106 may further include a shaft 122, two shaft mounts 126, 130, two cable spools 134, 138, and two biasing mechanisms 142, 146. The gearbox 120 transfers the rotational output of the motor 118 to the shaft 122. The shaft 122 has a length approximately equal to the width of the container 54, and may be rotatably supported beneath the container 54 by shaft mounts 126, 130. The shaft mounts 126, 130 may each include a bearing to rotatably support the shaft 122, as is known in the art. In the illustrated embodiment, a single motor 118 and shaft 122 is provided. Alternatively, each side of the container may be provided with its own motor and half-shaft, provided that the action of the motors is coordinated for efficient operation of the extension mechanism 106.

The cable spools 134, 138 are mounted to the ends of the shaft 122 to rotate with the shaft 122. The spools 134, 138 may be formed from rigid materials that resist wear including, but not limited to, steel, iron, or aluminum. The spools 134, 138 can be configured in a conventional manner to retain a cable 174, 178 wound thereon. For example, each spool 134, 138 may include opposite flanges extending perpendicularly from the winding surface to retain the cable 174, 178 wound thereon, to protect the wound cable 174, 178 from the elements, and to prevent fouling of the cable 174, 178. It can be appreciated that the motor, gearbox and diameter of the spools may be calibrated to provide a predetermined winding rate for the cables onto the spools.

A coupling member, such as a pin, may be provided to removably mount each spool 134, 138 to the shaft 122. Alternatively, the spools may be mounted to permit free-wheel rotation in one direction and driven rotation in the opposite direction. Thus, the spools maybe engaged for rotation with the shaft to wind the cable onto the spool, but then disengaged for free-wheel rotation when the cable is to be payed out from the spool. As a further alternatively, the gearbox 120 may be provided with a clutch operable to permit free-wheel rotation of the shaft, and therefore the spools, in one direction.

Figure 5:
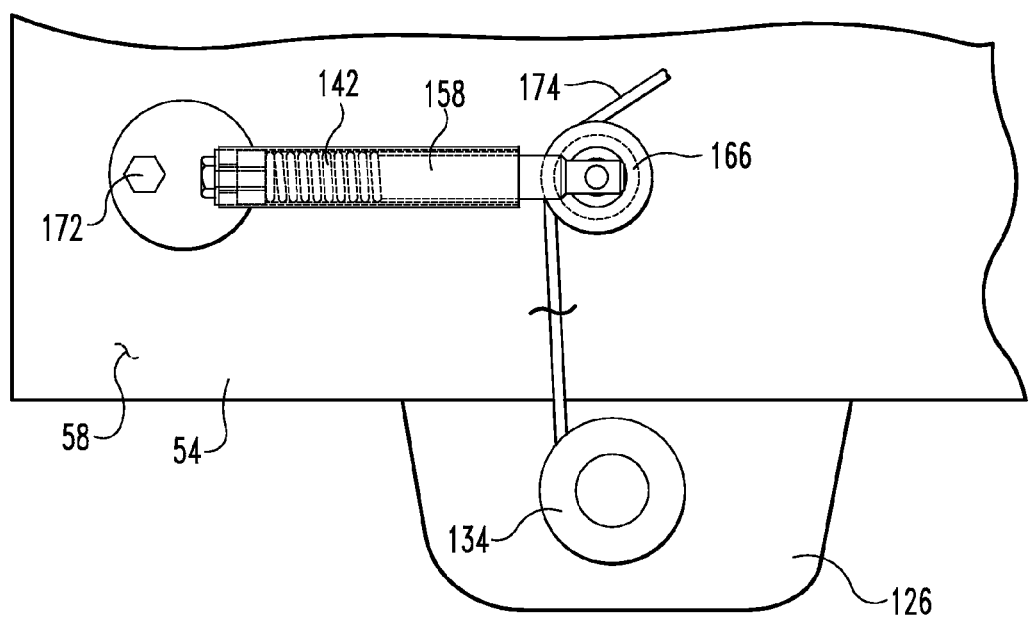
FIG. 5 is an elevational view of an exemplary idler pulley member as illustrated in FIGS. 2, 3, and 4.

The biasing mechanisms 142, 146 may be in the form of idler pulley members that include a pivot plate 150, 154, a biasing member 158, 162, and a pulley wheel 166, 170. As illustrated by the exemplary idler pulley member 142 of FIG. 5, the pivot plate 150 is pivotally mounted to the container, such as to the container sidewall 58 at a connection point 172. The pulley wheel 166 is rotatably secured to a front portion of the biasing member 158. The rear portion of the biasing member 158 is connected to the pivot plate 150. The biasing members 158, 162 are configured to bias the pulley wheels 166, 170 away from the cable (which is toward the rear of the container 54 in FIG. 2), thereby drawing slack from the cables 174, 178 while the tarp 110 is furling and unfurling. Furthermore, the idler pulley members 142, 146 are configured to pivot about the connection point 172 of the pivot plate 150, 154 in response to the position of the bail arm 74.

In one embodiment, the biasing mechanisms 142, 146 are arranged relative to the pivot mounts 86, 90 so that the side arms 78, 82 and the cables 174, 178 form a triangle throughout the full range of motion of the bail arm 74. Thus, the biasing mechanisms may be mounted on the container rearward of the rearmost position of the bail arm when the tarp is fully covering the container, as depicted in FIG. 2. This arrangement ensures that the cable will not foul with the bail arm during extension and retraction, and optimizes the retraction and hold-down force capability of the tarp extension mechanism The cables 174, 178 extend from the spools 134, 138 across the pulleys 166, 170, and connect to the brackets 98, 102 on the side arms 78, 82 of the bail arm 74. The cables 174, 178 may be formed from any high strength material that resists wear and stretching such as wire rope or may alternatively be in the form of a chain, a rope, a band or any other cordage that will allow the cables 174, 178 to be wound and released without substantial stretching and wearing over time. The length of the cables 174, 178 permits the bail arm 74 to pivot fully against the front of the container 54. The brackets 98, 102 may be braces, supports, or attachment sites of any type that will retain the cables 174, 178 in position relative to the side arms 78, 82. The brackets may be fixed to the side arms or may be connected to permit some relative sliding along the length of the side arms as the extension mechanism 106 is activated.

The extension mechanism 106 generates the force required to cover the container 54 with the tarp 110. Specifically, rotation of the motor 118 causes the cable spools 134, 138 to wind the cables 174, 178 thereon. The decreasing cable 174, 178 length forces the bail arm 74 to pivot toward the rear of the container 54, thereby causing the tarp 110 to unfurl from the winding mechanism 72 or drum and cover the open top of the container 54. In an alternative embodiment, the motor 118 could generate lateral force, rather than rotational force, and cause the cables 174, 178 to translate along the container rather than decrease in length, still forcing the bail arm 74 to pivot toward the rear of the container 54 and causing the tarp 110 to unfurl and cover the open top of the container 54.

The force exerted by the cables 174, 178 is applied to the brackets 98, 102, which are configured in one embodiment to remain in a fixed position about the length of the side arms 78, 82. The position of the brackets 98, 102 determines the direction of the force applied to the side arms 78, 82 as the extension mechanism 106 pivots the bail arm 74 from the front to the rear of the container 54. In particular, if the brackets 98, 102 are positioned near the pivot mounts 86, 90, the extension mechanism 106 may not be capable of generating a sufficient force to pivot the bail arm 74. Therefore, the brackets 98, 102 may be coupled to the side arms 78, 82 in a position near the middle or the upper portion of the side arms 78, 82, as illustrated in FIGS. 2, 3, and 4.

When the brackets 98, 102 are properly positioned upon the side arms 78, 82, the direction of the force exerted by the cables 174, 178 upon the bail arm 74 changes or self-regulates as the bail arm 74 pivots from the front to the rear of the container 54. In particular, when the taming system 50 is in the retracted position, as shown in FIG. 3, and the extension mechanism 106 begins to pivot the bail arm 74, the cables 174, 178 exert a largely horizontal force upon the bail arm 74. However, as the bail arm 74 approaches the rear of the container 54, as depicted in FIG. 2, the location of the brackets 98, 102 and the pivoting structure of the idler pulley members 142, 146, causes the horizontal component of the force to decrease and the vertical component of the force to increase. Accordingly, when the bail arm 74 reaches the rear of the container 54 the force exerted by the cables 174, 178 upon the side arms 78, 82 is largely in the vertical direction. This substantially vertically directed force holds the tarp 110 tightly against the container 54. Furthermore, the transition from a largely horizontal force to a largely vertical force ensures that the extension mechanism 106 effectively and smoothly pivots the bail arm 74 throughout the entire range of motion.

The position of the brackets 98, 102 upon the side arms 78, 82 and the mounting point of the idler pulley members 142, 146 determines the path of the cables 174, 178 along the sidewalls 58, 62 of the container 54 as bail arm 74 is pivoted. Therefore, the position of the brackets 98, 102 and the mounting point of the idler pulley members 142, 146 may be adjusted to provide a cable path that is unobstructed by irregularities upon the sidewalls 58, 62 of the container 54. Thus, in an alternative embodiment, the biasing mechanisms 142, 146 may be mounted near the bottom of the container with the spools 134, 138 offset along the length of the container.

The extension mechanism 106 may utilize any type of motor 118 that provides a sufficiently strong torque and sufficient withdrawal speed for the cables, including, but not limited to, mechanical, pneumatic, electric, hydraulic or any other type of motor capable of providing energy to the gearbox 120. The motor may be a linear motor with appropriate modifications to the gearbox. By positioning the motor 118 under the container 54, the extension mechanism 106 prevents the motor 118 from becoming damaged as the container 54 is upward pivoted due to contact with solid structures such as buildings, homes, trees, and other objects. Additionally, the position of the motor 118 prevents the motor from becoming damaged as a result of inadvertent contact with a front-end loader, backhoe, or other type of industrial loader or construction vehicle. Furthermore, the motor 118 is protected from weather, and is therefore less likely to become damaged due to repeated exposure to the sun, rain, and snow.

The extension mechanism 106 may utilize a gearbox 120 having a gear ratio that generates enough torque to rotate the shaft 122 in a manner that extends and retracts the tarp 110 in a reasonable amount of time. The gearbox 120 should also maintain the rotational position of the cable spools 134. Specifically, the structure of the gearbox 120 prevents an upward directed force upon the cables 174, 178 from rotating the spools 134, 138 or the shaft 122, even when the motor 118 is deenergized.

The tarping system 50 may be operated to cover a container 54 in the following manner Rotation of the motor 118 causes the shaft 122 to rotate in a direction that winds the cables 174, 178 upon the spools 134, 138. As the cables 174, 178 are wound upon the spools 134, 138 they apply a force to the brackets 98, 102 that pivots the bail arm 74 about the pivot mount 86, 90 toward the rear of the container 54. The motion of the bail arm 74 causes the tarp 110 to unfurl from the drum. As the drum rotates, the winding mechanism 72 generates a tarp 110 retraction force. Additionally, the pivoting motion of the bail arm 74 causes the springs in the retraction mechanism of the pivot mounts 86, 90 to generate a bail arm 74 retraction force. Furthermore, as the bail arm 74 pivots toward the rear of the container 54, the idler pulley members 142, 146 pivot about the pivot plates 150, 154 in response to the position of the bail arm 74.

As motor 118 continues to wind the cables 174, 178 around the spools 134, 138, the horizontal portion 94 of the bail arm 74 approaches and then contacts the rear wall of the container 54. Even after the horizontal portion 94 of the bail arm 74 contacts the container 54, the motor 118 continues to rotate for brief period causing the cables 174, 178 to exert a strong downward directed force upon the side arms 78, 82 that holds the bail arm 74 against the container 54. The motor 118 may be configured to automatically deenergize after a predetermined torque is developed. Alternatively, the motor 118 may be manually deenergized when a user determines that a sufficient torque has been developed.

After the container 54 has been covered with the tarp 110 and the motor 118 stops rotating, the structure of the gearbox 120 maintains the rotational position of the spools 134, 138. Furthermore, the cables 174, 178 maintain a tension on the bail arm 74 that resists the force generated by the billowing tarp 110. Thus, the tarping system 50 ensures that the extended tarp 110 remains held against the container 54 firmly, even when the container 54 is moving at highway speed.

The tarping system 50 retracts the tarp 110 by operating the motor 118 in a direction that unwinds the cables 174, 178 from the spools 134, 138. As the cables 174, 178 are unwound, the force developed by the retraction mechanisms at the pivot mounts 86, 90 pivots the bail arm 74 toward the front of the container 54, as illustrated in FIG. 3. Furthermore, the force generated by the winding mechanism 72 winds the tarp 110 upon the drum. The biasing members 158, 162 of the idler pulley members 142, 146 prevent the development of an excessive amount of cable 174, 178 slack by applying a rearward directed force to the cables 174, 178. The retraction mechanisms at the pivot mounts 86, 90 maintain the position of the bail arm 74 against the front wall 66 of the container 54 when the tarping system 50 is in the retracted configuration.

While the automated tarping system 50 described herein is susceptible to various modifications and alternative forms, specific embodiments thereof have been shown by way of example in the drawings and have herein been described in detail. It should be understood, however, that there is no intent to limit the automated tarping system 50 to the particular forms disclosed. On the contrary, the intention is to cover all modifications, equivalents, and alternatives falling within the spirit and scope of the invention.

What is claimed is:

1. A tarping system for a container having an open-top with a top edge, a bottom and side walls, comprising:
    a cover dimensioned to extend over the container and including a first end and an opposite second end, the first end mounted to the top edge of the container;
    at least one arm having a first end and a second end, the second end connected to the second end of said cover and said first end mounted at a fixed pivot to the container so that the arm can pivot to and from an extended position in which said cover is extended over the container;
    at least one cable corresponding to said at least one arm and connected to said arm between the first end and the second end thereof;
    a biasing mechanism mounted to the container and configured to slideably receive said cable, and
    a drive mechanism supported by the container and connected to said cable, said drive mechanism configured to pull said cable to thereby pivot said arm relative to the container.

2. The tarping system of claim 1, wherein the drive mechanism includes a motor and a shaft, the cable connected to the shaft to be wound onto the shaft as it rotates.

3. The tarping system of claim 1, wherein the drive mechanism is connected to the bottom of the container.

4. The tarping system of claim 1, wherein said cable is connected to the arm nearer to the second end of said arm than to the first end.

5. The tarping system of claim 1, wherein the arm further includes a horizontal bar at said second end of said arm that is attached to the second end of the cover.

6. The tarping system of claim 1, wherein the biasing mechanism is configured to exert a force on said cable to enable said cable to remain taut as said arm is pivoting.

7. The tarping system of claim 6, wherein said side walls define a length of the container, said biasing mechanism is offset along the length of the container from said first end of said arm pivotably mounted to the container.

8. The tarping system of claim 6, wherein the biasing mechanism includes:
    a biasing member having a first end connected to the container and an opposite second end, said biasing member configured to bias said second end toward said first end; and
    a pulley wheel connected to said second end of the biasing member and slideably receiving said cable.

9. The tarping system of claim 8, wherein said biasing member is a spring coil.

10. The tarping system of claim 1, wherein:
    said at least one arm includes two arms disposed on opposite sides of the container; and
    said at least one cable includes a cable associated with each of said two arms.

11. The tarping system of claim 10, further comprising a biasing mechanism associated with each cable, said biasing mechanism mounted to the container and configured to slideably receive said cable, said biasing mechanism configured to exert a force on said cable to enable said cable to remain taut as said arm is pivoting.

12. A tarping system for a container having an open top with a top edge, a bottom and side walls defining a length of the container, the tarping system comprising:
    a cover dimensioned to extend over the container and including a first end and an opposite second end, the first end mounted to the top edge of the container;
    at least one arm having a first end and a second end, the second end connected to the second end of said cover and the first end mounted at a fixed pivot to the container so that the arm can pivot to and from an extended position in which the cover is extended over the container;
    at least one cable corresponding to said at least one arm and connected to said arm at a point between the first end and the second end thereof;
    a biasing mechanism configured to slidingly receive said cable, said biasing mechanism mounted to the container at a location along the length of the container between the first end of the arm pivotally mounted to the container and the second end of said cover when said arm is in the extended position; and a drive mechanism supported by the container and connected to said cable, said drive mechanism configured to pull said cable to thereby pivot said arm relative to the container.

13. The tarping system of claim 12, wherein said drive mechanism includes a motor and a shaft, the cable connected to the shaft to be wound onto the shaft as it rotates.

14. The tarping system of claim 12, wherein the drive mechanism is connected to the bottom of the container.

15. The tarping system of claim 12, wherein said cable is connected to the arm nearer to the second end of said arm than to the first end.

16. The tarping system of claim 12, wherein said biasing mechanism is configured to exert a force on said cable to enable said cable to remain taut as said arm is pivoting.

17. The tarping system of claim 16, wherein said biasing mechanism includes:

a biasing member having a first end connected to the container and an opposite second end, said biasing member configured to bias said second end toward said first end; and a pulley wheel connected to said second end of the biasing member and slideably receiving said cable.

18. The tarping system of claim 16, wherein said biasing mechanism is mounted to the container at a location so that said cable moves to an increasingly vertical orientation when said arm is in said extended position.

19. The tarping system of claim 1, wherein said at least one cable is slideably connected to said at least one arm to slide along a length of said arm.

20. The tarping system of claim 12, wherein said at least one cable is slideably connected to said at least one arm to slide along a length of said arm.

* * * * *